United States Patent [19]

Williscraft

[11] 3,997,951
[45] Dec. 21, 1976

[54] CUTTING TOOLS
[75] Inventor: Bruce Williscraft, Clinton, Canada
[73] Assignee: Ex-Cell-O Corporation, Troy, Mich.
[22] Filed: Mar. 15, 1976
[21] Appl. No.: 666,849

Related U.S. Application Data

[63] Continuation of Ser. No. 505,188, Sept. 11, 1974, abandoned.
[52] U.S. Cl. .............................................. 29/96
[51] Int. Cl.$^2$ ....................................... B26D 1/00
[58] Field of Search ........................................ 29/96

[56] References Cited
UNITED STATES PATENTS

| | | | |
|---|---|---|---|
| 3,238,600 | 3/1966 | Milewski | 29/96 |
| 3,268,977 | 8/1966 | Diemond | 29/96 |
| 3,354,526 | 11/1967 | Erkfritz | 29/96 |
| 3,469,296 | 9/1969 | Reeve et al. | 29/96 |
| 3,491,421 | 1/1970 | Holloway | 29/96 |

Primary Examiner—Leonidas Vlachos
Attorney, Agent, or Firm—James H. Bower; Frank D. Risko

[57] ABSTRACT

This invention is the method and apparatus for locking an indexable replaceable cutting tool insert into a cutting tool holder using a tilting pin type device consisting of a pivotally recessed pin with a resilient member and set screw which lock the insert into an insert pocket of the tool holder.

10 Claims, 4 Drawing Figures

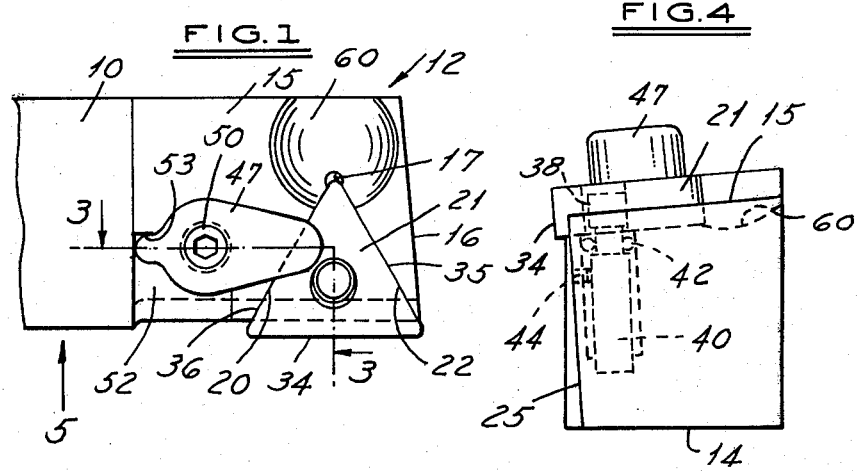
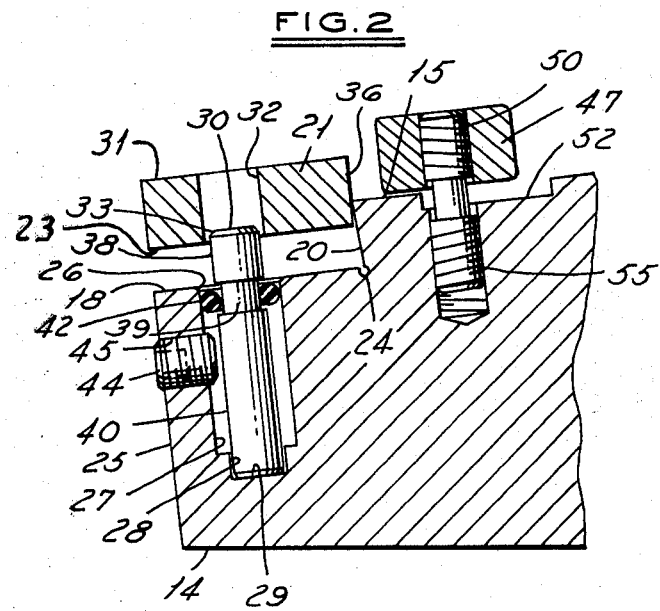
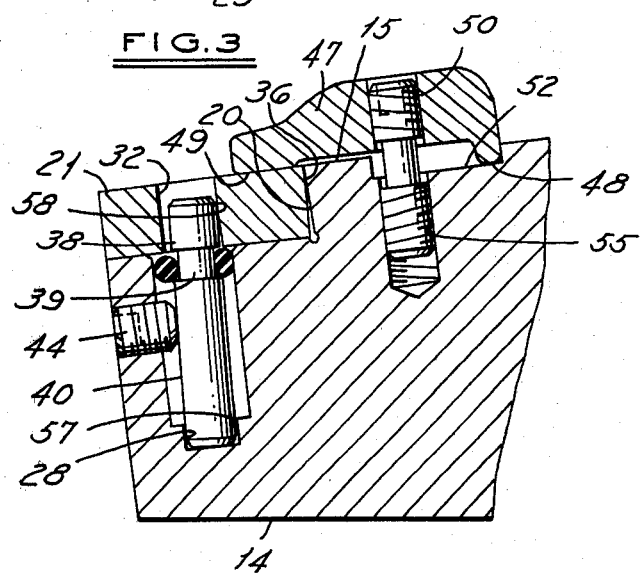

CUTTING TOOLS

This is a continuation of application Ser. No. 505,188 filed Sept. 11, 1974, now abandoned.

BACKGROUND OF THE INVENTION

1. Field of the Invention

This invention relates to the assembling and disassembling of cutting tool inserts with multiple cutting edges into a cutting tool holder and the method for holding and locking the insert.

2. Description of Prior Art

The use of replaceable inserts in machine tool applications for cutting material in machining operations is well known and recognized in this art. Almost all of these devices are of the quick release and change type mechanisms for replacing the cutting tool insert and have anywhere from one to four pieces which make up the complete cutting tool. Many different devices for holding and securing the insert are known in this art wherein springs and pivots are used to assist in retraction of the locking device for quick change of the insert. Also in this art are may dual pin devices and pins which are expensive because of their shape and configuration. This invention overcomes these shortcomings by its simplicity and design.

SUMMARY OF THE INVENTION

This invention relates to an indexable insert securing means for replaceable tip cutting tools. Said inserts can be made from hard material such as carbide and this invention presents a novel means for securing and locking said insert into a pocket in the tool holder. The pocket sides coact with the insert when it is tightened into place by an angular tilting action of a pivotally recessed pin with a resilient member that locks the insert into the tool holder and provides a unique release of the insert.

A principal object of this invention is to provide a means for securely locking an indexable cutting tip in a tool holder pocket and includes a simple and quick mechanism for changing the tip.

Further object of this invention is to allow the use of utility inserts as well as precision ground inserts. The utility insert is recognized by industry as one with open tolerance on the cutting edges.

A further object is to allow the indexing of this tip as it becomes worn from use.

Another object is to provide an insert pocket in a tool holder which the the tilting lock pin will keep the cutting insert from rising up out of the seat when the insert is tightened into place and also during the stress of a cutting operation.

In this invention the axis of the locking screw positively determines the direction of applied force.

A further object of this invention is to provide proper vertical position of the screw which determines the amount of applied force.

Another object is to provide a resilient member which assists in releasing the insert from its pocket and this resilient member acts as a seal preventing cutting chips and dust from clogging the recessed pivot.

Another object of this invention is that the resilient member is slightly compressed so that it remains in position at all times.

Further object is to provide a resilient member which prevents the pin from falling out when the insert has to be changed while the tool holder is in a tilted or upside down position.

Still another object is to provide an inexpensive and low cost alternate to present methods of holding cutting tips.

Other objects of this invention will become apparent and will be best understood when taken in view of the accompanying drawing supplied herein.

BRIEF DESCRIPTION OF THE DRAWING

FIG. 1 is a plan view of a cutting tool showing the relative location of the tool holder, cutting tip and locking pin.

FIG. 2 is a sectional view of the structure in FIG. 1 in a partially assembled position.

FIG. 3 is a sectional view of the structure in FIG. 1 along 3—3 in a locked position.

FIG. 4 is a front view of the cutting tool showing relative location of the cutting tip, locking pin, and screw.

DESCRIPTION OF THE INVENTION

Referring now to the drawings, and partially to FIG. 1 through FIG. 3, therein is a cutting tool holder, referred to by numeral 5, consisting of a shank 10 generally rectangular in cross section with provisions for attaching to a tool post of a conventional metal cutting machine such as a lathe. The shank 10 is integrally connected to the head 12 which forms the whole of the tool holder 5 with the head 12 having a tapered trapeziform section which is smaller at the bottom 14 front than the shank 10 section. The top surface 15 is tipped down toward front surface 16 with a pocket consisting of bottom surface 18 as the seat and surfaces 20 and 22. The shape of the pocket consisting of surfaces 18, 20 and 22 is similar to insert 21 with the surfaces 20 and 22 having a 90° maximum angle to a slightly less than 90° angle to bottom surface 18 at undercut 24 shown in FIG. 2. A clearance hole 17 perpendicular to bottom surface 18 provides for clearance of the insert's 21 tip.

A cylindrical hole 27 in FIG. 2 with its axis perpendicular to the pocket surface 18 is accurately disposed in the head section 12 with chamfer 26 at the opening and with a recess hole 28 perpendicular to pocket surface 18 on the same center line as cylindrical hole 27 with a bottom surface 29 approximately parallel to pocket surface 18. Recess hole 28 is slightly larger than dowel pin 30.

The insert 21 has a hole 32 substantially at the goemetric center of the insert opposed faces, the axis of the hole 32 being substantially perpendicular to the parallel planes of said faces 23 and 31. Said insert 21 when in use, for example, can have a total of six cutting edges by indexing it three times and turning insert 21 upside down and indexing three more times. Other insert shapes, such as square and pentagonal, can afford still larger numbers of usable cutting edges and can be used with this invention.

A tilting lock pin or dowel pin 30, shown in FIG. 2, consists of a short end cylinder 38 which connects to an undercut cylinder 39 and to a long end cylinder 40. A resilient member 42, such as a standars size 0 ring made from rubber or similar material, is located at the undercut cylinder 39. This undercut 39 in pin 30 is located slightly below the pocket surface 18 so that resilient member 42 is approximately even with the surface 18. This affords the added advantage of keeping cutting chips and dust particles out of this hole. The resilient member 42 is sized so that it completely fills the void between the undercut 39 on pin 30 and hole 27. The set screw 44 is disposed in thread 45 in head 12 and is tightened with a standard allen type or hexagon key.

An optional clamp 47 is shown with a pivot surface 48 and clamp surface 49 which can lock the insert 21 into place by the differential screw 50. A recessed surface 52, shown in FIG. 1 and FIG. 3, allow pivot 48 room to rotate out of the way during insert position change or removal. Shoulder 53 acts as a stop for the pivot 48 on clamp 47 during the tightening process. Threads 55 disposed in head 12 will receive the differential screw 50 for clamping insert 21.

OPERATION OF THE INVENTION

The locking of insert 21 into tool holder 5 is shown in FIG. 2 and FIG. 3 and is as follows. The tilting lock pin 30 is inserted into recess 28 with resilient member 42 in place which also acts to center pin 30 in hole 27. The insert 21 is easily slipped over the short end cylinder 38 which is slightly smaller in diameter than the insert hole 32 with the chamfer 33 on the tilting lock pin 30 allowing for ease of insertion and removal of the insert 21.

With the insert 21 sitting on the surface 18 of the pocket, the set screw 44 in thread hole 45 can now be tightened and will make contact with the long end cylinder 40 of the tilting lock pin 30. As screw 44 is tightened, the short end cylinder 38 will make contact with the insert hole 32 exerting forces in such a way so as to bring faces 36 and 35, respectively of the insert 21 in contact with side surfaces 20 and 22 of the pocket. Movement of the tilting lock pin 30 will cause the resilient member 42 to be compressed, making its cross-section smaller but causing the section opposite to expand as shown exaggerated in FIG. 3. As pin 30 tilts in its recessed hole 28 to its final position, shown in FIG. 3, contact at 57 between long end cylinder 40 and hole 28 acts as a pivot point, causing the short end cylinder 38 to make contact 58 with insert hole 32 exerting locking forces between the insert rear surfaces 36 and 35 and the pocket back wall 20 and 22, respectively. Conversely, initial rotation in reverse of set screw 44 and interaction of resilient member 42 displaces the tilting lock pin 30 to skew away from contact with the insert hole 32 centralizing pin 30 by equalization of forces in the resilient member 42 allowing easy and rapid removal of the insert 21 for its indexing or replacement.

FIG. 3 is a sectional view illustrating the contact action between pocket back walls 22 and 20 and the insert 21. This is slightly exaggerated to show the clamping action of the intersection of top surface 15 and pocket back walls 20 and 22 which hold the insert 21 at or near the top. This clamping action is the result of the secure contact with the back walls 20 and 22 of the pocket which keeps the insert 21 firmly seated on pocket surface 18 when the tool holder 10 and insert 21 are in an actual machining operation. A further optional clamping is provided by clamp 47 which is shown clamping insert 21 in place by the action of pivot 48 on surface 52 and the tightening of differential screw 50.

Contact between a workpiece and the intersection of top surface insert 21 and front face 34 of the insert 21 will cause a force at this intersection which would cause faces 36 and 35 of the insert 21 to try to rise out of the pocket but is prevented from doing so because of the aforementioned clamping actions.

The clamping action of surfaces 20 and 22 interacting with surfaces 36 and 35 also prevents the insert 21 from rising up out of the pocket when it is tightened into place by the tilting lock pin 30 upon original installation on the insert 21 or when the insert 21 is indexed to expose a new cutting surface edge such as the intersection of top surface with faces 36 or 35 to a workpiece.

A slight spherical surface 60 is also provided in head 12, as shown in FIG. 1, which will allow a finger or thumb to slip down at the apex of the insert 21 to assist in removing it from the pocket.

Am essential feature of the invention is the contact locking facility that automatically adjusts by the further movement of the pin to form a clamping force, when tightened between the recessed hole and short cylinder of the pin that is transmitted through the pin to the surface of the hole in the insert (which by nature of the shape is forced into the pocket) by the pivot action of the pin causing the clamping result. It should also be noted that, because of this design, the system is self-adjusting and automatically compensates for any wear that occurs to the various contact surfaces. If the resilient member should wear because it becomes embrittled due to age, environment or use, it is a very inexpensive replacement item.

While preferred embodiments of the invention have been illustrated and described, it will be understood that various changes and modifications may be made without parting from the spirit of the invention.

What I claim as new and desire to secure by Letters Patent of the United States is:

1. In a cutting tool
   a. a disposable cutting insert having a hole substantially at the geometric center;
   b. a body providing a flat bottom support surface and at least one side wall which forms a pocket means against which said insert rests;
   c. a first hole communicating with and perpendicular to said bottom support surface co-axial with a second smaller blind and recessed hole disposed in said body;
   d. a cylindrical pin means with one end pivotally disposed within the limits of said second hole and having an undercut portion thereon and having a resilient member disposed on said pin in said undercut portion and flush with said bottom of pocket wherein said resilient member is sized to fill void between said pin and said first hole the other end of said pin projecting into hole of said insert;
   e. a set screw disposed in said body projected toward said pocket means approximately perpendicular to said pin means and intersecting said first hole; and
   f. said pin tiltable by said screw means locking said insert in said pocket wherein said resilient member is deformed by compressing and displacing said resilient member to maintain contact with said pin and periphery of said first hole 2. The cutting tool of claim 1 wherein a spherical indentation means is located in head of tool.

3. The cutting tool of claim 1 in which side wall of said pocket means is angled in such a direction so as to produce a line contact with the rear side of the insert when the locking pin is tightened.

4. The cutting tool of claim 1 wherein a clamp means and differential screw means are disposed to release or restrain said insert.

5. The cutting tool of claim 1 wherein said resilient member is a rubber O-ring.

6. In a cutting tool
 a. a disposable cutting insert having a hole substantially at the geometric center;
 b. a body providing a flat bottom and at least two side(s) walls converging which form a pocket means against which said insert rests;
 c. a first recessed hole communicating with and perpendicular to said bottom support surface co-axial with a second smaller blind and recessed hole disposed in said body;
 d. a cylindrical pin means with one end pivotally disposed in said second hole and having an undercut portion thereon and having a resilient member disposed on said pin in said undercut portion and flush with said bottom of pocket wherein said resilient member is sized to fill void between said pin and said first hole with other end of said pin projecting into hole of said insert;
 e. a set screw projected toward juncture of said pocket means approximately perpendicular to said pin means disposed in said body and intersecting said first hole; and
 f. said pin tiltable by said screw means locking said insert in said pocket wherein said resilient member is deformed by compressing and displacing said resilient member to maintain contact with said pin and periphery of said first hole.

7. The cutting tool of claim 6 wherein a spherical indentation means is located in head of tool.

8. The cutting tool of claim 6 in which side walls of said pocket are angled in such a direction so as to produce a line contact with the rear sides of the insert when the locking pin is tightened.

9. The cutting tool of claim 6 wherein a clamp means and differential screw means are disposed to release or restrain said insert.

10. The cutting tool of claim 6 wherein said resilient member is a rubber O-ring.

* * * * *